(12) United States Patent
Haslacher

(10) Patent No.: US 9,252,573 B2
(45) Date of Patent: Feb. 2, 2016

(54) DRAW-IN WIRE TIP WITH A BASE PART

(75) Inventor: Andreas Haslacher, Mondsee (AT)

(73) Assignee: Haslacher & Haslacher Immobilien & Patentverwaltungs GmbH, Thalgau (AT)

( * ) Notice: Subject to any disclaimer, the term of this patent is extended or adjusted under 35 U.S.C. 154(b) by 117 days.

(21) Appl. No.: 13/496,493

(22) PCT Filed: Sep. 15, 2010

(86) PCT No.: PCT/EP2010/063507
§ 371 (c)(1),
(2), (4) Date: Mar. 16, 2012

(87) PCT Pub. No.: WO2011/032953
PCT Pub. Date: Mar. 24, 2011

(65) Prior Publication Data
US 2012/0187353 A1 Jul. 26, 2012

(51) Int. Cl.
*H02G 1/08* (2006.01)
(52) U.S. Cl.
CPC ............... *H02G 1/081* (2013.01); *H02G 1/083* (2013.01)
(58) Field of Classification Search
USPC ..................................... 254/134 FT
See application file for complete search history.

(56) References Cited

U.S. PATENT DOCUMENTS

| | | | | |
|---|---|---|---|---|
| 2,008,227 A | * | 7/1935 | Reilly | 403/284 |
| 2,509,100 A | * | 5/1950 | Jordan | 254/134.3 FT |
| 2,750,152 A | * | 6/1956 | Schinske | 254/134.3 FT |
| 3,110,478 A | | 11/1963 | Bostick | |
| 3,675,898 A | * | 7/1972 | Fattor et al. | 254/134.3 FT |
| 3,696,546 A | * | 10/1972 | Ambrose | 43/17 |
| 3,858,848 A | * | 1/1975 | MacFetrich | 254/134.3 FT |
| D271,017 S | * | 10/1983 | Spycher | D14/236 |
| 4,435,713 A | * | 3/1984 | Gasparaitis et al. | 343/702 |
| D290,121 S | * | 6/1987 | Claxton | D14/233 |
| D310,224 S | * | 8/1990 | Cooper | D14/230 |
| 4,969,286 A | * | 11/1990 | Belanger | 43/25 |
| 5,016,490 A | * | 5/1991 | Jaksic | 74/501.5 R |
| 5,067,843 A | * | 11/1991 | Nova | 403/301 |
| D325,384 S | * | 4/1992 | Cooper | D14/234 |
| D325,385 S | * | 4/1992 | Cooper | D14/234 |
| 5,152,630 A | * | 10/1992 | Walloch | 403/284 |
| 5,156,063 A | * | 10/1992 | Kelley | 74/501.5 R |
| D352,431 S | * | 11/1994 | Bassett | D8/14 |
| 5,423,584 A | * | 6/1995 | Pasternak | 294/19.2 |
| 5,472,251 A | * | 12/1995 | Deininger | 294/19.2 |
| 5,615,881 A | * | 4/1997 | Potter | 273/140 |
| 5,628,538 A | * | 5/1997 | Ericksen | 294/210 |
| D386,052 S | * | 11/1997 | Nasir | D8/14 |
| D390,763 S | * | 2/1998 | Nasir | D8/14 |
| 5,761,550 A | * | 6/1998 | Kancigor | 396/176 |
| 5,788,608 A | * | 8/1998 | Wilkinson | 482/51 |

(Continued)

FOREIGN PATENT DOCUMENTS

| | | |
|---|---|---|
| DE | 299 09 420 | 9/1999 |
| EP | 1 058 361 | 12/2000 |

(Continued)

*Primary Examiner* — Lee D Wilson
*Assistant Examiner* — Alvin Grant
(74) *Attorney, Agent, or Firm* — Jordan IP Law, LLC; Todd A. Vaughn

(57) ABSTRACT

A draw-in wire tip and a respective draw-in wire body each having optimized flexural strength in such a way that insertion of a draw-in wire which is composed of these two components is easily possible, even in complex tube systems.

20 Claims, 2 Drawing Sheets

(56) References Cited

U.S. PATENT DOCUMENTS

| | | | |
|---|---|---|---|
| 5,823,590 A * | 10/1998 | Forrest et al. | 294/104 |
| D403,932 S * | 1/1999 | Klamm | D8/14 |
| 5,870,845 A * | 2/1999 | Ruderman et al. | 40/601 |
| 5,908,214 A * | 6/1999 | Dinardo | 294/19.2 |
| 6,182,432 B1 * | 2/2001 | Takahashi | 57/200 |
| 6,327,803 B1 * | 12/2001 | Ruderman | 40/601 |
| 6,485,075 B1 * | 11/2002 | McClain | 294/19.2 |
| 6,490,999 B1 * | 12/2002 | Boys | 119/792 |
| D491,926 S * | 6/2004 | Tai et al. | D14/230 |
| 7,322,735 B1 * | 1/2008 | Caldani | 362/648 |
| D656,373 S * | 3/2012 | Martin | D8/14 |
| D660,113 S * | 5/2012 | Bigelow | D8/38 |
| 8,282,079 B2 * | 10/2012 | Petti | 254/134.3 R |
| D676,295 S * | 2/2013 | Anderson | D8/14 |
| 8,385,712 B2 * | 2/2013 | Ahmed | 385/136 |
| 8,412,017 B2 * | 4/2013 | Kowalczyk et al. | 385/136 |
| 2003/0095411 A1 * | 5/2003 | Blackwelder | 362/385 |
| 2006/0065883 A1 * | 3/2006 | Radle et al. | 254/134.3 FT |
| 2009/0121505 A1 * | 5/2009 | Shatilla | 294/19.1 |

FOREIGN PATENT DOCUMENTS

| | | | | |
|---|---|---|---|---|
| EP | 1953882 A1 * | 8/2008 | | H02G 1/08 |
| JP | 10 336829 | 12/1998 | | |
| WO | WO 2006/027400 A1 | 3/2006 | | |

* cited by examiner

DRAW-IN WIRE TIP WITH A BASE PART

CROSS-REFERENCE TO RELATED APPLICATIONS

The present application is a National Stage Application of PCT International Application No. PCT/EP2010/063507 (filed on Sep. 15, 2010), under 35 U.S.C. §371, which claims priority to EP Patent Application No. 09170333.0 (filed on Sep. 15, 2009), and EP Patent Application No. 09170336.3 (filed on Sep. 15, 2009), which are each hereby incorporated by reference in their respective entireties.

FIELD OF THE INVENTION

The invention relates to a draw-in wire tip with a base part, a flexible part and a head part for draw-in wires for drawing lines into tubes and cavities and the like.

BACKGROUND OF THE INVENTION

Draw-in wires for this purpose usually include a part with a holding apparatus attached to the tip for the lines to be drawn in. They are not very suitable for more complex tube systems with changing tube parameters such as changes in the diameter or the direction because they need to have a certain stability on the one hand so that they can also be pushed easily through longer tube systems and a certain flexibility on the other hand so that they will not get stuck in tighter curves, which cannot be achieved by an integral configuration. The draw-in wires as disclosed in WO 2006/027400 A1, U.S. Pat. No. 3,110,478 A1 and EP 1 058 361 A1 are all characterized in that the described frame is supplemented by a draw-in wire tip, the tip allegedly representing an improvement by an increase in the flexibility. Nevertheless, easy drawing into more complex tube systems is not ensured.

It is known from U.S. Pat. No. 6,182,432 B to provide a draw-in wire tip of reduced stiffness for facilitating the insertion of the draw-in wire. The specification alternatively proposes to provide the draw-in wire itself in its front region with increased flexibility. This configuration allows inserting the draw-in wire in a comparatively easy manner even under unfavorable conditions. Nevertheless, this solution is not satisfactory because the production of a draw-in wire with continuously decreasing stiffness is complex and a weak point is provided in the tip region by the reduced cross section which prevents the transmission of high tensile forces when drawing in cables or the like.

SUMMARY OF THE INVENTION

It is the object of the invention to provide a draw-in wire tip and a respective draw-in wire body in such a way that their flexural strength is optimized in such a way that the insertion of a draw-in wire which is composed of these two components is easily possible, even in more complex tube systems or the like.

In particular, it is an object of the present invention to provide a solution that can be produced easily and at low cost and simultaneously offers substantially improved performance.

It is a further object of the invention to provide a draw-in wire which is sturdy and is suitable for a large number of applications.

This object is achieved in accordance with the invention in such a way that the flexibility of the draw-in wire tip increases from the base part in the direction towards the head part and the flexible part includes a tension rod which connects the base part with the head part.

It can especially be provided that the tension rod is enclosed and preferably extrusion-coated with a sleeve made of plastic. Flexibility shall be understood here as the inverse value of the flexural stiffness.

Surprisingly, the best possible combination of strength and flexibility can be found thereby. The invention therefore represents an ideal solution because the flexural stiffness is lowest at the draw-an wire tip where flexibility comes to bear to the highest extent close to the head part and increases precisely at this location in the rear region, and therefore, close to the base part where stiffness and strength is most necessary for the purpose of the ability to push the wire through a tube system. As a result, the head part of the draw-in wire can be very sensitive to changes in the tube parameters and a draw-in wire body of higher flexural strength can still be used.

The relevant aspect is the high loading capacity in the direction of tension which is caused by the tension rod which is optimized to tensile strength and consists of a wire cable for example. As a result of the high tensile stress of the material, the cross section of the tension rod can be kept small, as a result of which flexibility is not impaired.

A linear rise in the elasticity of the elastic part in the direction of the head part of often represents a preferred variant which has an especially high utilization due to the large variety of applications.

The increase in the elasticity in the direction of the head part can be produced in such a way that the elastic part of the draw-in wire tip tapers from the base part in the direction towards the head part. Profiles which are arranged in any desired manner can be produced thereby with minimal effort, which profiles have different bending behaviors depending on the thickness, length and shape of the tapering portion.

As a result of a respective variation in the thicknesses of the flexible part with respect to its area, draw-in wires with a large variety of elasticity behaviors can be produced and the ideal draw-in wires can be created for the various applications.

The reduction in the stiffness towards the tip can also occur in a graduated manner in that one or several tapering portions are provided in a successive fashion or also in that several different materials with different moduli of elasticity in the axial direction follow one another, which materials are formed for example by a multi-component injection molding method around the tension rod.

In order to ensure that a line can be drawn through a tube system after successfully penetrating the same, a holding apparatus can be attached to the head part of the draw-in wire, to which the line can be attached in order to retract the draw-in wire again and to bring the cable to the desired position in the tube system thereby.

In order to enable the attachment of the draw-in wire tip to a draw-in wire body, a holding apparatus such as a clamping apparatus or a thread can be attached to the base part. It is especially advantageous if the draw-in wire tip is removably fastened to the draw-in wire body.

The flexible part can consist of a tension rod and a jacket, with the former being provided by a flexible steel, glass-fiber or polyester cable or the like, which guarantees the stability of the draw-in wire and prevents tearing or braking under high loads. This tension rod is protected and stabilized by the extrusion-coated material, with the thickness and the configuration of the material of the jacket influencing the elasticity of the flexible part in addition to the type and configuration of the tension rod. The jacket encloses the tension rod and is preferably extrusion-coated. This means that the plastic of the jacket is produced by an injection molding process in which the tension rod is placed into the mold. This leads to an intimate connection between the tension rod and the jacket.

The ratio of outside diameter of the jacket to the diameter of the tension rod is important in order to set the respective bending and strength properties. Usually, a relatively thin tension rod is chosen as compared with the jacket.

In order to ensure that the individual parts of the draw-in wire tip do not detach from one another under high tensile stresses, the fixing of the flexible part to the head or base part is chosen in such a way that it can be easily produced and it is cheap on the one hand, and is also able to withstand the respective loads on the other hand. Clamping of the tension rod in a respectively provided borehole or cavity in the base or head part is one possible embodiment which has already proven its advantages.

If the tension rod is under tensile stress in production during the extrusion-coating of the jacket material, it is possible to guarantee the evenness and quality of the extrusion-coating of the tension rod with the jacket on the one hand. On the other hand, a permanent pretensioning of the tension rod in relation to the jacket is ensured, thereby further improving the bending and strength combination.

In particular, a removable cap can be provided on the head part. It can alternatively be arranged as a ball, cone or the like, either with or without a pulling lug.

The draw-in wire tip can be attached to any draw-in wire body, wherein it would obviously be advantageous if a draw-in wire body of chosen flexural strength were used in order to maximize effectiveness of the draw-in wire tip.

The aforementioned draw-in wire body can be made of steel or, in an especially preferred manner, of plastic; both variants offer respective advantages with their materials, in the production of steel, the arrangement as a flexible shaft is especially advantageous.

The aforementioned draw-in wire body can also be coiled, i.e. twisted, which offers special advantages in the use of devices which facilitate the drawing in of the draw-in apparatus.

The fact that the minimum flexibility occurring on the flexible part of the draw-in wire tip is larger than the maximum flexibility occurring on the draw-in wire body can surprisingly be of importance because a loss in the thrusting force can be avoided which occurs in such a way that the draw-in wire body bends first instead of the draw-in wire tip in a situation with changing configuration of the tube, e.g. a curve.

BRIEF DESCRIPTION OF THE DRAWINGS

The invention will be explained in closer detail below by reference to embodiments shown in the drawings to which the invention shall not be limited, wherein.

DETAILED DESCRIPTION OF EMBODIMENTS

Figure 1:
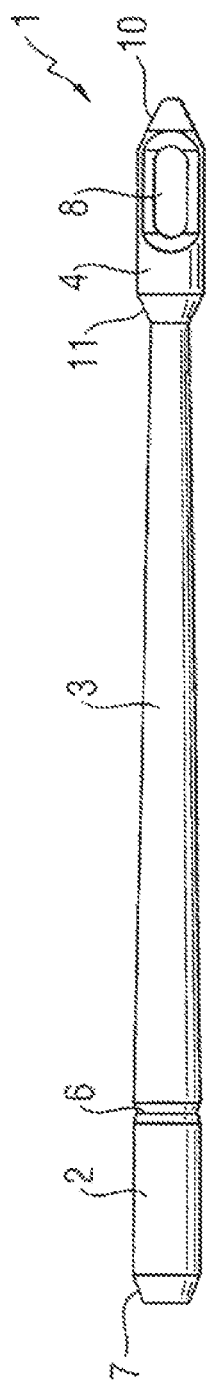
FIG. 1 illustrates a side view of a variant of the draw-in wire tip 1.

The variant illustrates in FIG. 1 is a draw-in wire tip 1 which is composed of a tapering flexible part 3, a base part 2 and a head part 4, with the flexible part 3 being delimited by the base part 2 and the head part 4. The base part 2 includes a notch 6 on the side facing the flexible part 3 in order to hold the flexible part 3 in a clamping fashion, and a beveled portion 7 on the side facing away from the flexible part 3. The head part 4 includes a holding apparatus 8 for lines, which in this embodiment is formed via an eye and beveled portions 10, 11 at the two ends.

Figure 2:
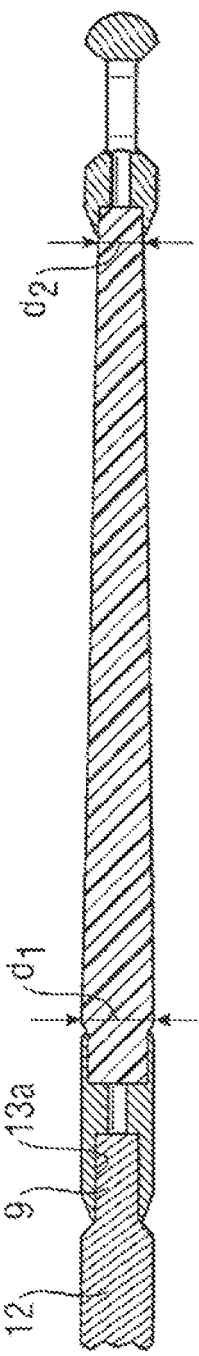
FIG. 2 illustrates an axial sectional view through the same variant of the draw-in wire tip and the part of the draw-in wire body which rests on the draw-in wire tip 1.

The axial sectional view as illustrated in FIG. 2 discloses a receiver in the form of a cylindrical cavity 13a in the base part 2 which, when the draw-in wire tip 1 is attached to a draw-in wire body 12, is filled by an end part 9 of the draw-in wire body 12 in order to produce a connection which can be subjected to a tensile load. It further shows that the base part 2 and the head part 4 protrude beyond the flexible part 3 and enclose the same, thereby producing a fixed contact.

The diameter $d_1$ of the flexible part 3 in the region of the base part 2 is in the ratio of 1:0.8 in relation to the diameter $d_2$ of the flexible part 3 in the region of the head part 4. Optimal variation of the stiffness can be achieved thereby.

Figure 3:
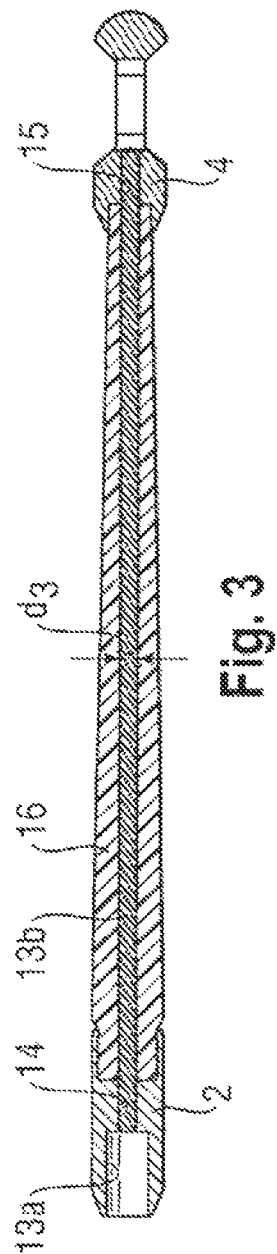
FIG. 3 illustrates a further embodiment of the draw-in wire tip with a flexible part which includes a jacket and a tension rod.

In the embodiment of FIG. 3, a tension rod 13b is embedded in a cylindrical cavity 14 in the base part 2 and in a cylindrical cavity 15 in the head part 4, and enclosed by a jacket 16 between the base and head part 2 and 4.

The ratio of the outside diameter $d_1$, $d_2$ of the jacket 16 to the diameter $d_3$ of the tension rod 13b is between 1:0.1 and 1:0.5. An optimal combination of tensile strength and flexural strength can be achieved thereby.

Figure 4:
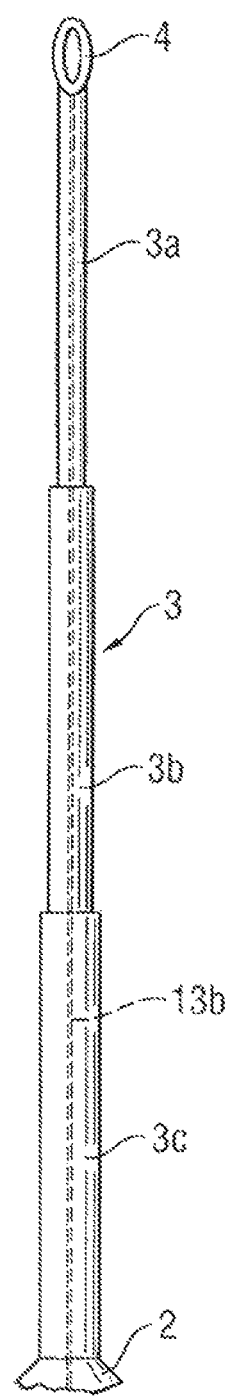
FIG. 4 illustrates a further variant of a draw-in wire tip.

FIG. 4 illustrates a variant of the draw-in wire tip 1 in which the flexible part 3 is integrally composed of three partial pieces 3a, 3b and 3c of graduated diameter, by which the stiffness in relation to the base part 2 will increase gradually. The tension rod 13b is embedded in the center as before.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A draw-in wire tip, comprising:
   a base having a first cavity and a second cavity at opposite ends thereof;
   a head configured to permit a line to be drawn therethrough;
   a flexible part composed of a single piece extending longitudinally between and connected at respective ends thereof to the head and the first cavity of the base, the flexible part having a first outer diameter which is adjacent to the base part, and a second outer diameter which is adjacent to the head, the first outer diameter being greater than the second outer diameter;
   a tension rod extending longitudinally through the flexible part, the base and the head, and which connects the base to the head; and
   a draw-in wire body received by the second cavity of the base.

2. The draw-in wire tip of claim 1, wherein the tension rod is enclosed by the flexible part.

3. The draw-in wire tip of claim 1, wherein the flexible part is composed of plastic.

4. The draw-in wire tip of claim 1, wherein the flexible part has an outer diameter which is tapered.

5. The draw-in wire tip of claim 1, wherein the head includes a holding apparatus to permit a line to be drawn therethrough.

6. The draw-in wire tip of claim 1, wherein a ratio of the first outer diameter to the second outer diameter is in a range between 1:0.9 and 1:0.55.

7. The draw-in wire tip of claim 1, wherein the tension rod has a third outer diameter.

8. The draw-in wire tip of claim 7, wherein a ratio of the first outer diameter to the third outer diameter is in a range between 1:0.1 and 1:0.5.

9. The draw-in wire tip of claim 1, wherein the tension rod comprises steel cable.

10. The draw-in wire tip of claim 1, wherein the tension rod comprises plastic fibers.

11. The draw-in wire tip of claim 1, wherein the tension rod includes a first end which is one of embedded and clamped in a cavity of the head.

12. The draw-in wire tip of claim 11, wherein the tension rod includes a second end opposite to the first end and which is one of embedded and clamped in the first cavity of the base.

13. The draw-in wire tip of claim 1, wherein the tension rod is pre-tensioned with respect to the flexible part.

14. A draw-in wire for drawing lines into one of tubes and cavities, the draw-in wire comprising:
 a tip that includes:
  a base having a first cavity and a second cavity at opposite ends thereof;
  a head including a holding apparatus to permit the line to be drawn therethrough;
  a flexible part composed of a single piece extending longitudinally from the first cavity of the base to the head, the flexible part having a first outer diameter which is adjacent to the base, and a second outer diameter which is adjacent to the head, the first outer diameter being greater than the second outer diameter;
  a tension rod extending longitudinally through the head, the flexible part and the base; and
 a body received by the second cavity of the base to form a connection therewith.

15. The draw-in wire of claim 14, wherein the tension rod has a third outer diameter.

16. The draw-in wire tip of claim 15, wherein a ratio of the first outer diameter to the third outer diameter is in a range between 1:0.1 and 1:0.5.

17. A draw-in wire tip, comprising:
 a head including a holding apparatus to permit a line to be drawn therethrough;
 a base;
 a flexible part composed of a single piece received at one end thereof by the head and at a second end thereof by the base, and which has a first outer diameter adjacent to the base part, and a second outer diameter adjacent to the head which is less than the first outer diameter;
 a tension rod which extends longitudinally through the head, the flexible part and the base; and
 a body which is received by and extends longitudinally from the base.

18. The draw-in wire tip of claim 17, wherein the flexible part is composed of plastic.

19. The draw-in wire tip of claim 17, wherein the minimum flexibility which occurs in the tip is greater than the maximum flexibility which occurs in the body.

20. The draw-in wire tip of claim 17, wherein the tension rod comprises one of steel cable and plastic fibers.

\* \* \* \* \*